United States Patent
Fildebrandt et al.

(10) Patent No.: US 10,783,007 B2
(45) Date of Patent: Sep. 22, 2020

(54) LOAD DISTRIBUTION FOR INTEGRATION SCENARIOS

(71) Applicant: SAP SE, Walldorf (DE)

(72) Inventors: Ulf Fildebrandt, Oftersheim (DE); Madhav Bhargava, Kanpur/Uttar Pradesh (IN); Sapreen Ahuja, Bangalore (IN); Sripad J, Bangalore (IN)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 16/148,008

(22) Filed: Oct. 1, 2018

(65) Prior Publication Data

US 2020/0104190 A1    Apr. 2, 2020

(51) Int. Cl.
G06F 9/46    (2006.01)
G06F 9/50    (2006.01)

(52) U.S. Cl.
CPC ...... *G06F 9/5088* (2013.01); *G06F 2209/503* (2013.01)

(58) Field of Classification Search
None
See application file for complete search history.

(56) References Cited

U.S. PATENT DOCUMENTS

| | | |
|---|---|---|
| 7,461,346 B2 | 12/2008 | Fildebrandt et al. |
| 7,584,457 B2 | 9/2009 | Hammerich et al. |
| 7,590,614 B2 | 9/2009 | Fildebrandt et al. |
| 7,734,560 B2 | 6/2010 | Seeger et al. |
| 7,757,204 B2 | 7/2010 | Fildebrandt et al. |
| 7,770,103 B2 | 8/2010 | Hammerich et al. |
| 7,774,745 B2 | 8/2010 | Fildebrandt et al. |
| 7,840,935 B2 | 11/2010 | Fildebrandt et al. |
| 7,840,936 B2 | 11/2010 | Seeger et al. |
| 7,853,923 B2 | 12/2010 | Muenkel et al. |
| 7,873,942 B2 | 1/2011 | Shaburov et al. |
| 7,962,892 B2 | 6/2011 | Shaburov et al. |
| 8,126,961 B2 | 2/2012 | Fildebrandt |
| 8,341,593 B2 | 12/2012 | Fildebrandt et al. |
| 8,689,174 B2 | 4/2014 | Shaburov et al. |
| 9,411,665 B2 | 8/2016 | Fildebrandt |
| 9,946,577 B1 * | 4/2018 | Stafford .................. H04L 67/10 |
| 9,996,344 B2 | 6/2018 | Fildebrandt et al. |
| 2014/0108489 A1 | 4/2014 | Glines et al. |

OTHER PUBLICATIONS

EP Extended European Search Report in European Appln. No. 18207520, dated Feb. 12, 2019, 7 pages.
Balasubramanian et al., "Evaluation the performance of middleware load balancing strategies," IEEE Enterprise Distributed Object Computing Conference, Sep. 2004, 135-146.

* cited by examiner

*Primary Examiner* — Gregory A Kessler
(74) *Attorney, Agent, or Firm* — Fish & Richardson P.C.

(57) ABSTRACT

The disclosure generally describes methods, software, and systems for handling integration flows. A set of flows is initially deployed to a single worker set. A load balancing issue is identified that is associated with initial runtime interactions by workers with the single worker set. In response to identifying the load balancing issue, the load balancing issue is analyzed to determine whether to autoscale or generate a new worker set. Load balancing is performed to initiate at least one new worker set. At least one flow to be moved to the at least one new worker set is identified. Movement of the identified at least one flow from a current worker set to a new worker set is performed.

14 Claims, 10 Drawing Sheets

LOAD DISTRIBUTION FOR INTEGRATION SCENARIOS

BACKGROUND

The present disclosure relates to handling integration flows.

SUMMARY

This disclosure generally describes computer-implemented methods, software, and systems for assigning and managing workflows, including managing load distribution for integration scenarios. One computer-implemented method includes: deploying a set of flows initially to a single worker set; identifying a load balancing issue associated with initial runtime interactions by workers with the single worker set; in response to identifying the load balancing issue, analyzing the load balancing issue to determine whether to autoscale or generate a new worker set; performing load balancing to initiate at least one new worker set; identifying at least one flow to be moved to the at least one new worker set; and performing movement of the identified at least one flow from a current worker set to a new worker set.

The foregoing and other implementations can each optionally include one or more of the following features, alone or in combination. In particular, one implementation can include all the following features:

In a first aspect, combinable with any of the previous aspects, wherein load balancing issues include out-of-memory exceptions.

In a second aspect, combinable with any of the previous aspects, wherein identifying at least one flow to be moved to the at least one new worker set includes randomly moving the at least one flow.

In a third aspect, combinable with any of the previous aspects, wherein identifying at least one flow to be moved to the at least one new worker set includes: performing a pre-calculation to define a complexity metric; and distributing, based on the complexity metric, the flows across worker sets.

In a fourth aspect, combinable with any of the previous aspects, wherein the complexity metric is a measure of complexities of the flow including one or more of a number of steps in the flow or a number of special steps in the flow.

In a fifth aspect, combinable with any of the previous aspects, wherein special steps include mapping steps and scripting steps.

In a sixth aspect, combinable with any of the previous aspects, wherein the flow represents an integration scenario.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for performing load distribution for flows. For example, a flow can be an iFlow that represents an integration scenario. Using techniques described in this disclosure, the number of iFlows can be split to a manageable size for a worker, preventing the overloading of workers. For example, new worker sets can be started, which can solve distribution problems. Techniques are used that facilitate overcoming the problem that physical boundaries of a worker limit execution capabilities. Distributing iFlows to different worker sets makes it possible to execute all of the iFlows.

An option that uses a single-iFlow container can avoid conflicts of iFlow instances for the same resources (constant throughput problem). This is because there is simply one iFlow in a container, avoiding competition with other iFlows. A problem exists, however, in that this option can stretch the limits of the underlying technologies because of the number of iFlows (for example, in current implementations with 56K iFlow bundles×2 (high availability (HA))=112K).

In an option that uses a k-iFlow container, groups of iFlows can be grouped into sets of iFlows that are deployed to independent worker sets. The formula means that $k_1+k_2+ \ldots +k_{i=n}$ can be used to provide a runtime for each iFlow, where all the iFlows are deployed directly.

An option that uses API server/worker separation can simply split iFlows using microservices. The API server can expose the endpoints, and the worker can contain the pipeline execution.

Figure 1:
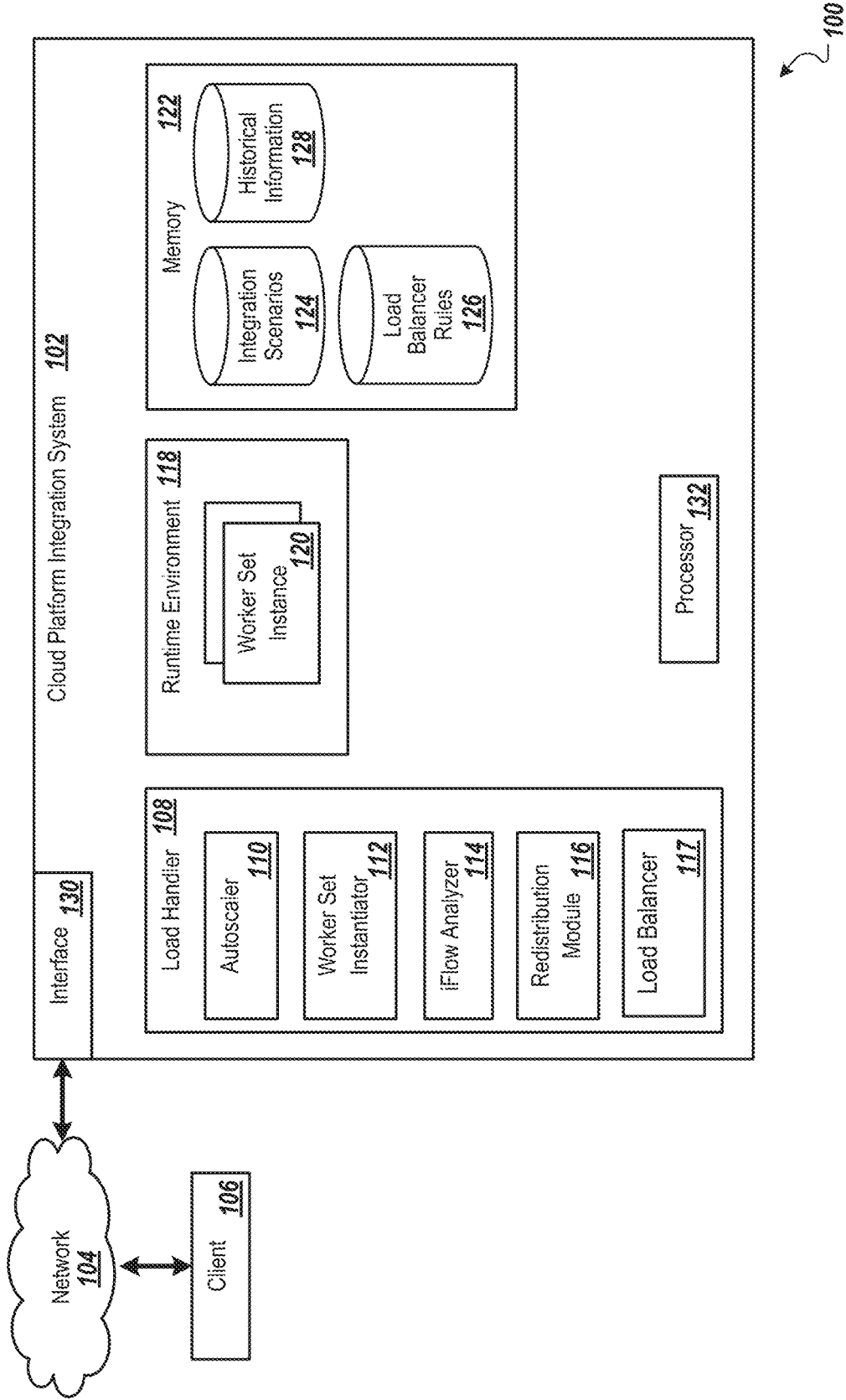
FIG. 1 is a block diagram of an example environment for performing load handling.

FIG. 1 is a block diagram of an example environment 100 for performing load handling. The environment 100 includes a cloud platform integration system 102 that operates in the cloud (for example, using a network 104) and provides integration services for work flows performed by users (for example, using at least one client 106).

The cloud platform integration system 102 includes a load handler 108 that manages relevant operations (including load balancing) and an autoscaler 110 that performs autoscaling processes. The autoscaling processes can include creating homogenous copies (or instances) of a particular worker set. Thresholds are used in determining when autoscaling should occur (versus creating a new worker set instantiation), and can include the use of metrics to assist in the determination. The metrics can include metrics that are related to central processor unit (CPU) use (for example, "Is the CPU usage X % (for example, 80%) for a pre-determined threshold period of time"). The metrics can also include metrics that are related to memory (for example, "Is there N % memory usage over a pre-determined period of time?"). CPU and memory consumption are two metrics, but the complexity of the iFlow is another metric. An iFlow's complexity can be based on bundle size (for example, in kilobytes (KB)), iFlow size (for example, the number of steps in the iFlow), and iFlow step types.

The autoscaler 110 can have limitations when, for example, too many iFlows are deployed to a worker instance, which can require a split of the worker set. Thus, a combination of autoscaling and instantiating new worker sets can be used. The selection of one approach over the other can be based on various criteria, including the number of iFlows and the number of worker instances.

A worker set instantiator 112 can be configured to generate a new worker set, for example, when the autoscaling alone cannot handle one or more of the additional resources or the requirements of the new worker set. Various thresholds can be used for determining when a new worker set is to be created. For example, a first threshold can be associated with a number of instances of a worker set (for example, five instances). If the autoscaler 110 cannot distribute the load in a useful way, flows can be switched (or reassigned) to other worker sets. A second threshold can be established as a number of iFlows in a worker set. For example, if too many flows are in a worker set, the flows can be re-allocated to other existing or new worker sets. The term worker set instantiator 112 can be used synonymously with or can be referred to as a content orchestrator. The content orchestrator, for example, can trigger the start of worker sets, for example by delegating to a tenant resource manager.

In some implementations, in order to achieve high-availability, worker sets can be instantiated (for example, by default) with two instances of workers. If the autoscaler 110 increases the number of instances, it will do this only for one worker set. The other worker sets are not impacted, because they handle different iFlows.

An iFlow analyzer 114 can perform various tasks associated with analyzing resources. For example, the iFlow analyzer 114 can determine resources that are needed for the execution of iFlows. The iFlow analyzer 114 can also determine resources used during execution, including determining when a monitored load exceeds a pre-determined threshold. The iFlow analyzer 114 can also analyze particular resource usage associated with iFlows and worker set instances. In some implementations, the iFlow analyzer 114 can store (or be able to access) historical information on certain iFlows in order to obtain information used for pre-calculation considerations and complexity metrics. For example, the calculation can determine a number of steps, types of iFlow steps, and historical execution of particular iFlows. The iFlow analyzer 114 can notify the worker set instantiator 112 that additional worker sets are to be instantiated.

A redistribution module 116 can be configured to cause redistribution of iFlows to occur between different worker sets. For example, based on iFlow analyzer results, the redistribution module 116 can move one or more particular iFlows into different worker set. A load balancer 117 can be used to balance loads.

A runtime environment 118 can be configured to manage one or more instantiated worker set instances 120, including managing the iFlows of integration scenario executing within the worker sets. Using a simple algorithm, for example, the runtime environment 118 can start with only one worker set for use in the deployment of iFlows. Using the simple algorithm for worker set distribution can include simply dividing the number of iFlows in half and distributing the iFlows equally between the two worker sets. A disadvantage of the simple algorithm is that there is no identification of iFlows that may cause problems (for example, using additional resources, based on complexity). As such, the simple algorithm can serve primarily as a divide-and-conquer strategy for splitting worker sets. Example splits can include [10→5+5] or [10→5+2+3] (in which the second five-iFlow worker is subsequently split). Alternatively, using a pre-calculation algorithm and based on known characteristics of iFlows, the runtime environment 118 can start multiple worker sets upon deployment. The pre-calculation algorithm can use the iFlow analyzer 114 to equally balance the complexity in the worker sets. Using the iFlow analyzer 114 can prevent an undesirable situation in which, for example, a majority of complex iFlows are assigned to one worker set and non-complex iFlows are assigned to other different worker set.

The cloud platform integration system 102 includes memory 122 that can store integration scenarios 124. Flow information (including iFlow definitions) that is defined in the integration scenarios 124 can be used by the iFlow analyzer 114 to determine static resources that are needed based, for example, on defined flows and flow patterns. Each iFlow definition can include, for example, an associated instantiation overhead and information about resources that are needed to execute the iFlow.

Load balancer rules 126 stored in the memory 122 can identify autoscaler thresholds and worker set generation thresholds. Historical information 128 stored in the memory 122 can include information about particular flows including, for example, resource consumption and other statistical information for particular flows.

The cloud platform integration system 102 includes an interface 130 that provides interface services to clients 106. The cloud platform integration system 102 also includes a processor 132 that can execute instructions of modules and components of the cloud platform integration system 102.

The cloud platform integration system 102 can be used for real-time distribution of iFlows at runtime so that resources can be used in a more efficient way. Considerations regarding efficiency can be explained using examples illustrating extreme conditions. In an un-optimized extreme case, all iFlows can be run on one runtime (for example, an n-iFlow case), which can create the problem, for example, of overloading an Open Service Gateway Initiative (OSGI) runtime with the number of bundles needed for the iFlows. In this example, a same-time execution of all iFlows can be potentially done on the same runtime, creating a resource sharing problem. Therefore, in considering efficiency, techniques for k-iFlow solutions can be used, where 1>k>n.

Each iFlow can be categorized based on the iFlow's characteristics. For example, in a static case, before an iFlow is deployed, the iFlow bundle for the iFlow can be analyzed regarding the iFlow's complexity. Criteria for categorizing the iFlow's complexity can include, for example, bundle size (for example, in kilobytes (KB)), iFlow size (for example, the number of steps in the iFlow), and iFlow step types. When considering iFlow step types, an assumption is that splitter, mapping, and script steps create significant memory and CPU usage.

In a dynamic case, for example, analyzing an iFlow's load after the iFlow is deployed, it is possible to measure the iFlow's usage of resources in real time. Measurements can be made, for example, of CPU use, memory use, a number of requests (per iFlow), the size of the requests, and out-ofmemory conditions, as exceptions can indicate that a particular iFlow on the runtime is creating problems.

Various algorithm approaches can be used in the distribution of iFlows. A first algorithm approach, for example, can start with a static analysis and fill a worker based on the static criteria optimized based on the dynamic measurements. This approach includes the challenge of redistribution of iFlows from one worker to another one. The pros of this approach include an optimized use of resources and subsequent redistribution of iFlows. A con of this approach includes the need for a complex redistribution algorithm.

A second algorithm approach, for example, can start with a static analysis and fill a worker based on the static criteria. If the worker set is full, a next worker set can be used, but there is no dynamic redistribution. The challenge in this approach is to define the static criteria in a good way to handle the resource consumption. The pros of this approach include a solution for the problem of number of OSGI bundles (because only a limited number of iFlows are running at the same time on a runtime) and the complexity to redistribute iFlows is low. Cons of this approach include the lack of a solution to the resource consumption problem (because all iFlows are deployed to handle requests) and there is no redistribution of iFlows).

Different ways for calculating resource usage can depend on the number of iFlows. The single-iFlow approach and the n-iFlow approach can provide two extremes, and the k-iFlow approach can provide a compromise. Advantages of the k-iFlow approach can become obvious, because with k iFlows it is possible to run a k-iFlow as a single-iFlow (running each iFlow in its own worker set) or an n-iFlow (only running one worker set). In the examples that follow, the number of iFlows is 400, runtime memory consumption is 1000 MB, iFlow memory consumption is 1 megabyte (MB), and the number of worker sets is 10.

In the single-iFlow approach, memory consumption can be, for example, 400,400 MB. The single-iFlow approach has the problem that the fixed memory consumption of runtime can lead to very high memory consumption overall. The number of workers is the number of iFlows.

In the n-iFlow approach, memory consumption can be, for example, 1400 MB. The n-iFlow approach can have the following disadvantages. First, it is not possible to deploy more than 200 iFlows to a worker. Second, because iFlows run together in one runtime, an exception in one iFlow can crash all of the other iFlows. However, memory consumption (including reuse of runtime) can be efficient.

In the k-iFlow approach, memory consumption can be, for example, 10,400 MB, and memory consumption of one worker can be 1040 MB. The k-iFlow approach can serve as a compromise between the n-iFlow approach (which can create a runtime problem with the number of iFlows) and memory consumption. The number of workers can be defined by the number of worker sets (which can be dynamically configurable).

Figure 2:
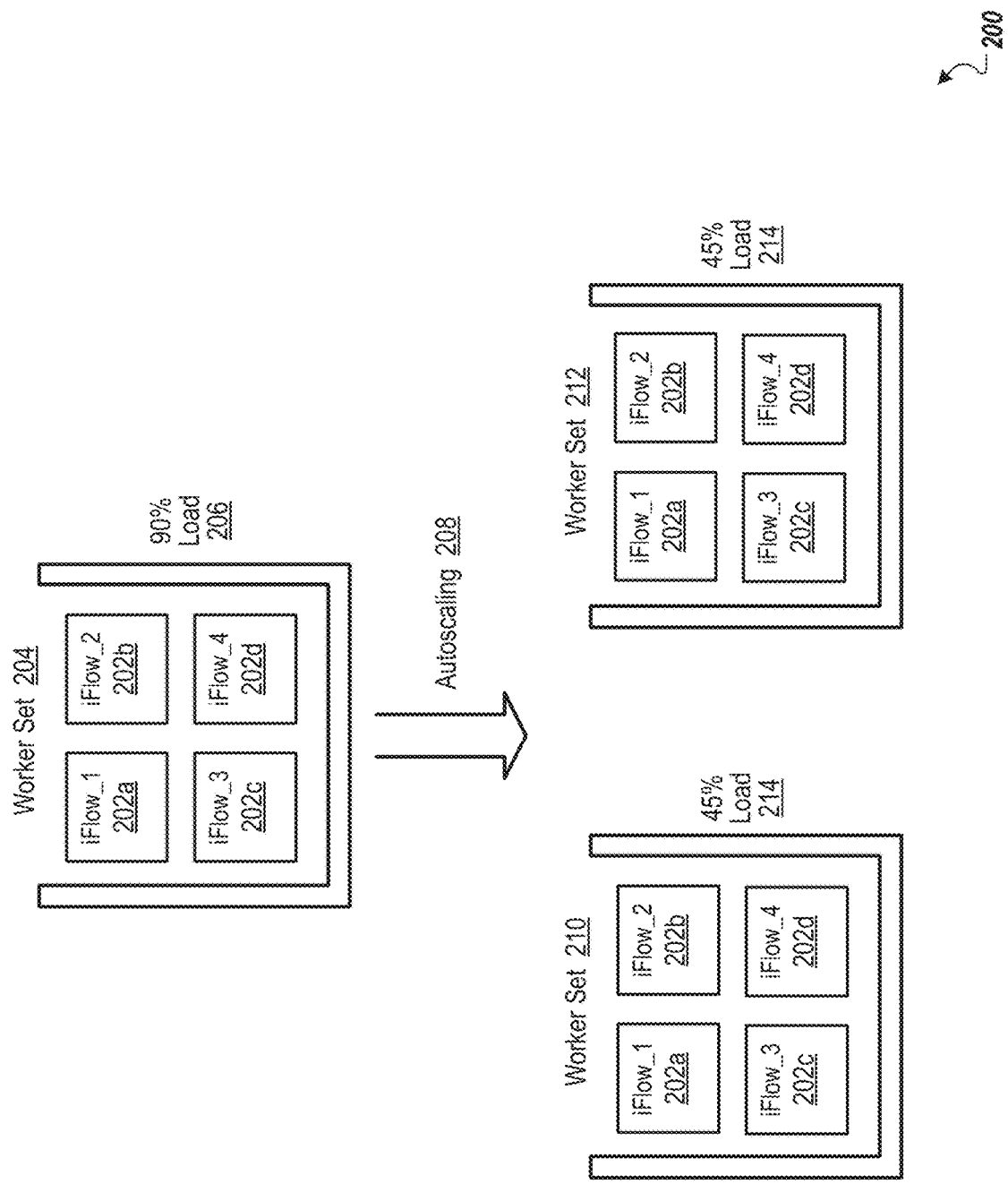
FIG. 2 is a block diagram illustrating an autoscaling redistribution.

FIG. 2 is a block diagram illustrating an autoscaling redistribution 200. The autoscaling redistribution 200 can solve a problem in which workers are under a heavy load (for example, iFlows 202a-202d in a worker set 204). A worker set under a 90% load 206 can be split, using autoscaling 208, into worker sets 210 and 212, each having a 45% load 214. In this example, half of the iFlows 202a-202d end up in each of the worker sets 210 and 212. However, autoscaling 208 cannot handle complex redistribution.

Figure 3:
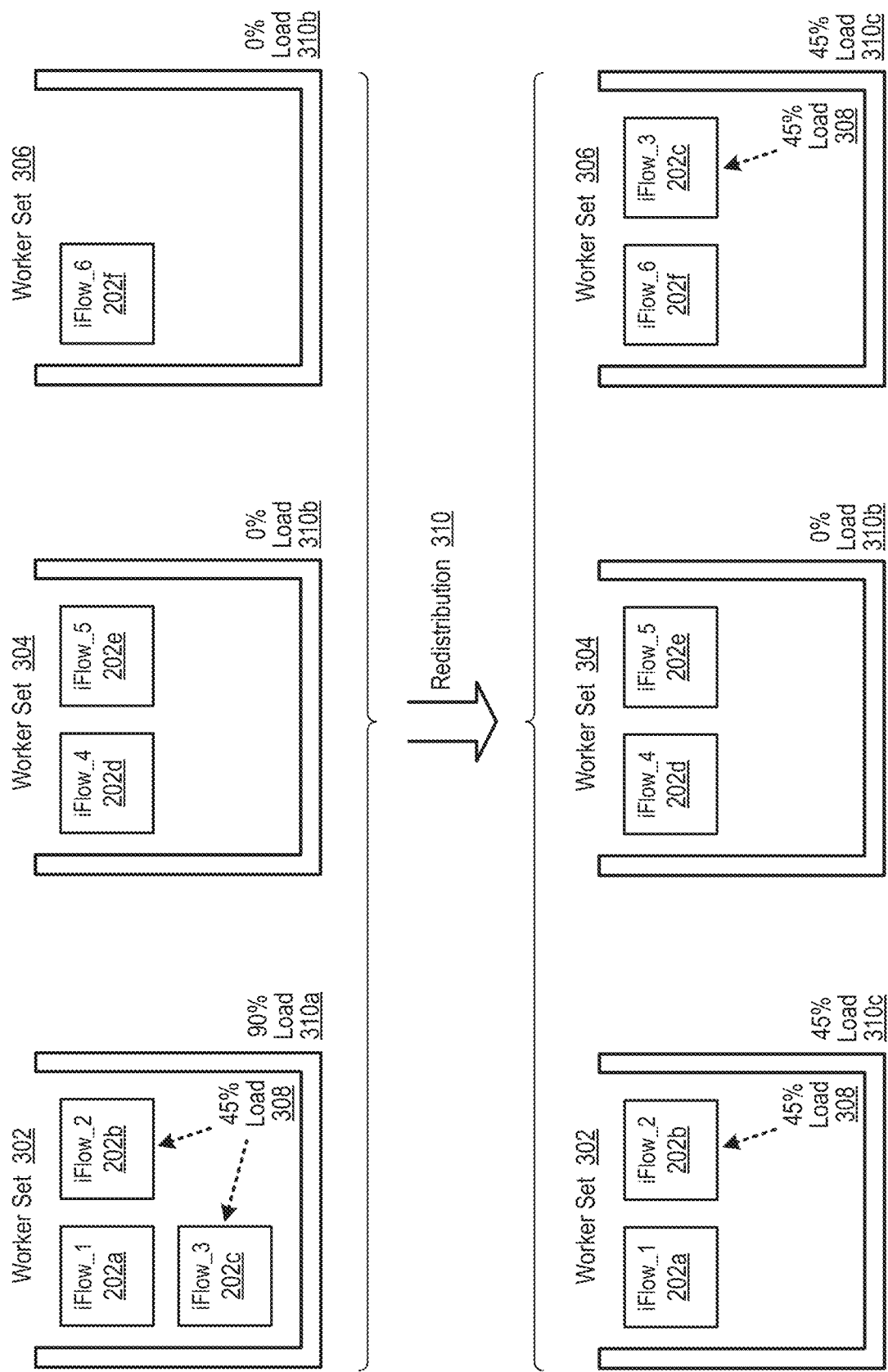
FIG. 3 is a block diagram illustrating a load-based redistribution.

FIG. 3 is a block diagram illustrating a load-based redistribution 310. Before redistribution, iFlows 202a-202f are distributed in worker sets 302, 304, and 306, which include three, two and one iFlow, respectively. Also, iFlow_2 202b and iFlow_3 202c are each determined to have a 45% load 308. In this example, the worker set 302 has a 90% load 310a (a heavy load), and the worker sets 304 and 306 each have a 0% load 310b. Under redistribution 310, the iFlow_3 202c can be moved from the worker set 302 to the worker set 306. As a result, the worker sets 302 and 306 can have a 45% load 310c, while the worker set 304 still has a 0% load 310b.

Redistribution 310 may not always be deterministic in determining which iFlow should be moved to another worker set and can lead to sub-optimal redistribution decisions with local optima. For example, after redistribution 310, iFlow_4 202d and iFlow_5 202e still do not have optimal resource utilization.

Various options can be used to improve the effectiveness of redistribution. In a first redistribution option, an application programming interface (API) server can be used to analyze the utilization of iFlows and a current allocation of iFlows to worker sets. A consequence is that unused iFlows can be un-deployed. Efficient redistribution can require an algorithm or framework to identify the iFlow that is under heavy load. The redistribution algorithm needs to be able to start the workers with changed sets of iFlows, and this can further increase the complexity of the API server.

In a second redistribution option without using an API server, redistribution algorithms still need to analyze the load of the iFlows and identify used iFlows. Challenges created without the use of the API server include relying on platform capabilities for dispatching. For example, platform capabilities have to be used to achieve a stable uniform resource locator (URL) for consumers of the endpoints. Smart redistribution is required to identify iFlow that are under heavy load and provide iFlows to different sets of workers.

Figure 4:
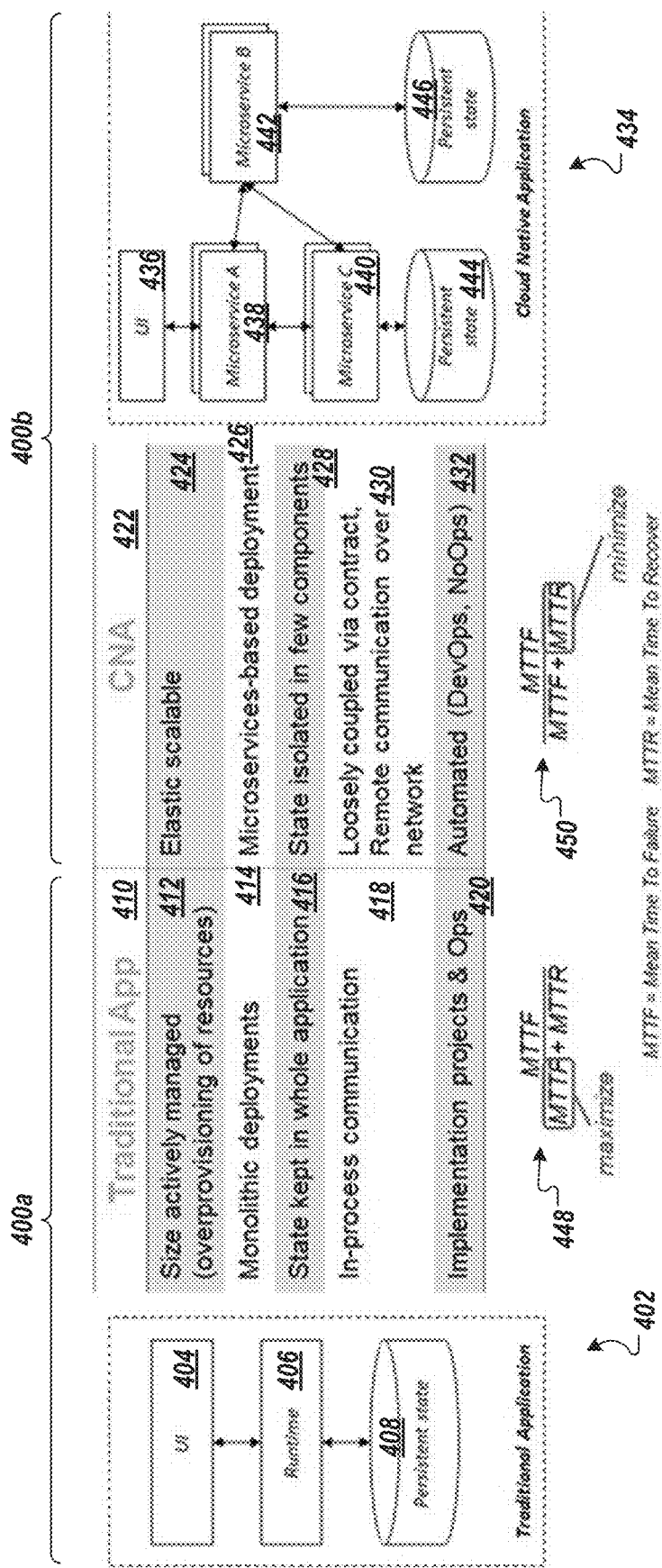
FIG. 4 is a block diagram showing examples of a traditional application and a cloud native application (CNA).

FIG. 4 is a block diagram showing examples of a traditional application 400a and a cloud native application (CNA) 400b. A traditional application 402 includes a user interface (UI) 404 that serves as a front-end to users. Flows are performed in a runtime environment 406 using a persistent state 408 of the work. In a traditional application (app) 410, size is actively managed 412, which can cause overprovisioning of resources and monolithic deployments 414. A state is kept 416 for the whole application. In-process communication 418 occurs, and implementation 420 occurs for projects and operations (ops).

The worker node can need to be scaled manually, leading to overprovisioning of resources to fulfill each request. Types of situations that stretch resources include, for example, peak (and very big) messages and constant throughput. In the case of peak (very big) messages, cloud platform integrations (CPIs) can get a 100 megabyte (MB) extensible markup language (XML) message. XML serialization can result in an explosion of used memory (assuming a 500 MB used heap size). If an iFlow contains a mapping, then an average factor of 6× can apply to memory consumption to transform the message from one format to the other (for example, 500 MB×6=3000 MB). In the case of constant throughput, the CPI can receive a lot of messages, and mapping and scripting can create a significant memory requests. When an out-of-memory-exception occurs, memory crashes can occur.

A CNA 422 is elastically scalable 424 and has a microservices-based deployment 426. States of flows are isolated (428) in a few components, and loosely coupled by contract, where remote communication (430) occurs over a network.

Deployment can be automated (432) for development operations (DevOps) and NoOps, including automation of deployment, monitoring, and management of iFlows.

A CNA 434 includes a UI 436 that serves as a front-end to users. Flows are facilitates using microservices 438-442 using persistent states 444 and 446. Reliability equations 448 and 450 applicable to the traditional app 410 and the CNA 422 can be based on mathematical relationships between a mean time to failure (MTTF) and a mean time to replacement (MTTR).

Various options can be used for managing iFlow containers. In a streaming option, a pipeline of iFlows can work with streaming to reduce the memory consumption.

In an option that uses splitting into microservices, a CNA architecture can recommend to split a runtime into smaller units to handle a load with smaller units. Because the mapping engine is focused on performing mappings, the mapping engine does not require so much memory. A peak scenario can potentially fit to this option, because a complete iFlow does not have to be held in memory. However, without streaming, the memory consumption of the mapping engine can be in the same dimension.

Figure 5:
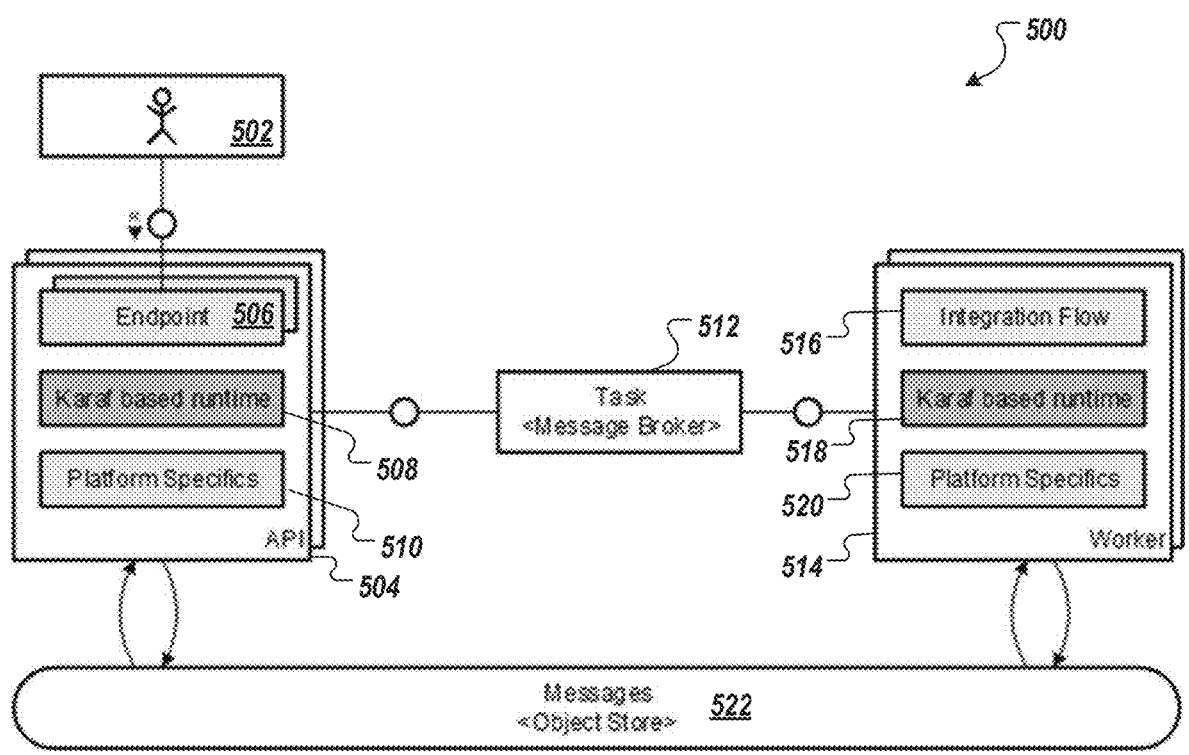
FIG. 5 is a block diagram of an example of execution process of iFlows.

FIG. 5 is a block diagram of an example of execution process 500 of iFlows. The execution process 500 covers a single-iFlow worker that is similar to the single-iFlow container implementations and in which the worker is only executing one iFlow. A user 502 performing tasks can interface with APIs 504 that provide endpoints 506, a runtime 508, and platform specifics 510. The APIs 504 can facilitate execution and management of a task 512 that is under the control of a worker instance 514. The worker instance 514 provides an integration flow 516, a runtime 518, and platform specifics 520. The APIs 504 and the worker instances 514 can handle messages 522 that are created during an iFlow.

tainer can always be started; 5) it may not be practical to combine the k-iFlow approach with dynamic distribution due to differing sets of complex challenges; 6) the API server has the potential to be a single point of failure (depending on the deployment topology), which can adversely affect scalability and reliability; and 7) it may be technically possible that multiple integration flows expose the same end-point.

In some implementations, splitting of iFlows can occur. In conventional systems, an iFlow can be transformed from a beans.xml packaged into an OSGI bundle. The split implies that the endpoint has to be pushed to the API server and the remaining iFlow has to go to the worker.

The iFlows can be categorized into three groups: 1) groups using hypertext transfer protocol (HTTP) endpoints, used for on-demand execution of iFlows; 2) groups using fast scheduling, in which adapters are polling regularly, and if new data exists, processing has to be started, for example, using file transfer protocol (FTP) or Java message service (JMS)); and 3) groups using irregular scheduling, including run-once or specific scheduling mechanisms.

Technology for splitting iFlows can include the following options. In a first option, API servers can reuse the same beans.xml. The beans.xml can be deployed to the API server, where only the consumer is executed because the route definition is changed dynamically.

A second option can use an API server with special beans.xml used for endpoint. In this option, iFlow generation can create two bundles: 1) beans.xml with a consumer endpoint and a delegate-to-worker endpoint; and 2) beans.xml with the remaining functionality of the iFlow.

A third option can use a Tomcat-API server, and iFlow generation can create an artifact in which the Tomcat-API server provides separate servlets for each iFlow and metadata to handle redirection of iFlows to workers (generic redirects at runtime).

TABLE 1

Per-container Size Parameters and Conditions

| N | One iFlow per container | | | K iFlows per container | | |
|---|---|---|---|---|---|---|
| iFlows per container | Without API-Server | With API-Server | With redistribution | Without redistribution | With redistribution and API-Server | K-iFlows/ container with assignment |
| Large no. of iFlows | No | Yes | Yes | Yes | Yes | Possible |
| Cost | Low | High | Medium | Medium | High/ Medium | Medium | Low to High |
| Isolation of iFlows | No | Yes | Yes | Partial | No | Partial | Possible |
| Complexity | Low | Low | Medium | High | Medium | High | Low |
| Dependency to Platform | Medium | Medium | Medium | High | Medium | High | Medium |

Figure 6:
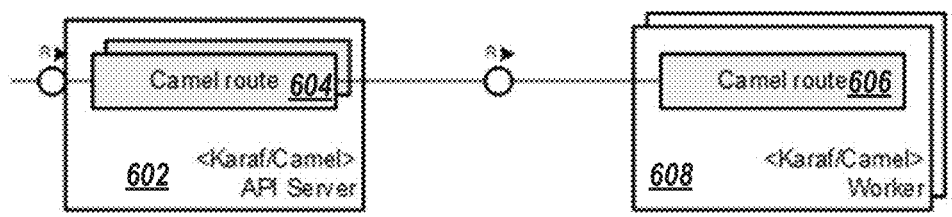
FIG. 6 is a block diagram of an example of server-to-worker interactions.

Some architecture decisions can be based on an evaluation of the API server/worker split with a single-iFlow worker set. The single-iFlow worker set can provide a fair compromise between complexity and resource optimization, assuming the following: 1) a warmed-up container pool is needed, as dynamic startup of containers would be too time-consuming; 2) a risk still exists, depending on the usage, that the cost could go up, as the resource sharing across containers is quite low (where the usage of iFlows per tenant is <50%); 3) the API server can use the load balancer for dispatching, allowing the load balancing, failover, and autoscaling to be handled by the platform; 4) for timer-triggered iFlows (typically a rare type of iFlow), the con- FIG. 6 is a block diagram of an example of server-to-worker interactions. An API server 602 can reuse a runtime to expose endpoints through at least one route 604 (and through a route 606 in a worker node 608). There can be a specific endpoint bundle that is executed on the API server. A pro is that scheduling adapters can be executed on the API server and no worker has to be started for polling operations. Cons include: a footprint of runtime to expose endpoints is higher than a Tomcat runtime, and transaction handling can become more complex for some adapters, for example, JMS and applicability statement 2 (AS2). Based on this information, implementations can use a light-weight API server to avoid the split of the beans.xml, and the route can run completely on the worker. Selected implementations can also be based on how the API server identifies the worker that will take over the work, including deploying the iFlow to the worker and evicting the iFlow in case there are no requests coming any more.

The selection of an architecture can be based, for example, on discovery being merged with the orchestrator functionality, because the orchestrator is responsible for distribution of bundles and lifecycle of nodes, e.g., the deployment of iFlow bundles to workers, therefore the state of workers and iFlows bundles is available/stored at the node orchestrator. As such, options for orchestrator can include the following.

The orchestrator can be considered one actor. However, evaluation can determine that the orchestrator has at least two purposes: node management and content management. Regarding node management, the orchestrator is responsible for all lifecycle operations of nodes, including API servers. The orchestrator is responsible for launching and stopping applications/pods. The orchestrator gathers information about the health of each application instance single actor which queries the number of applications running the health of each application. The orchestrator mounts file system volumes for each application/pod. The orchestrator defines and enforces security and network policies for each application/pod. The orchestrator provides binding of services required by each application and cleanup of resources in case of stop of application/pod.

In some implementations, the orchestrator can be split into two main domains based on the dimension of tenancy (for example, multi-tenant node or tenant-specific). For example, four options can exist for the orchestrator: 1) multi-tenant node orchestrator, and multi-tenant content orchestrator; 2) multi-tenant node orchestrator, and tenant-specific content orchestrator; 3) tenant-specific node orchestrator, and multi-tenant content orchestrator; and 4) tenant-specific node orchestrator, and tenant-specific content orchestrator.

Figure 7:
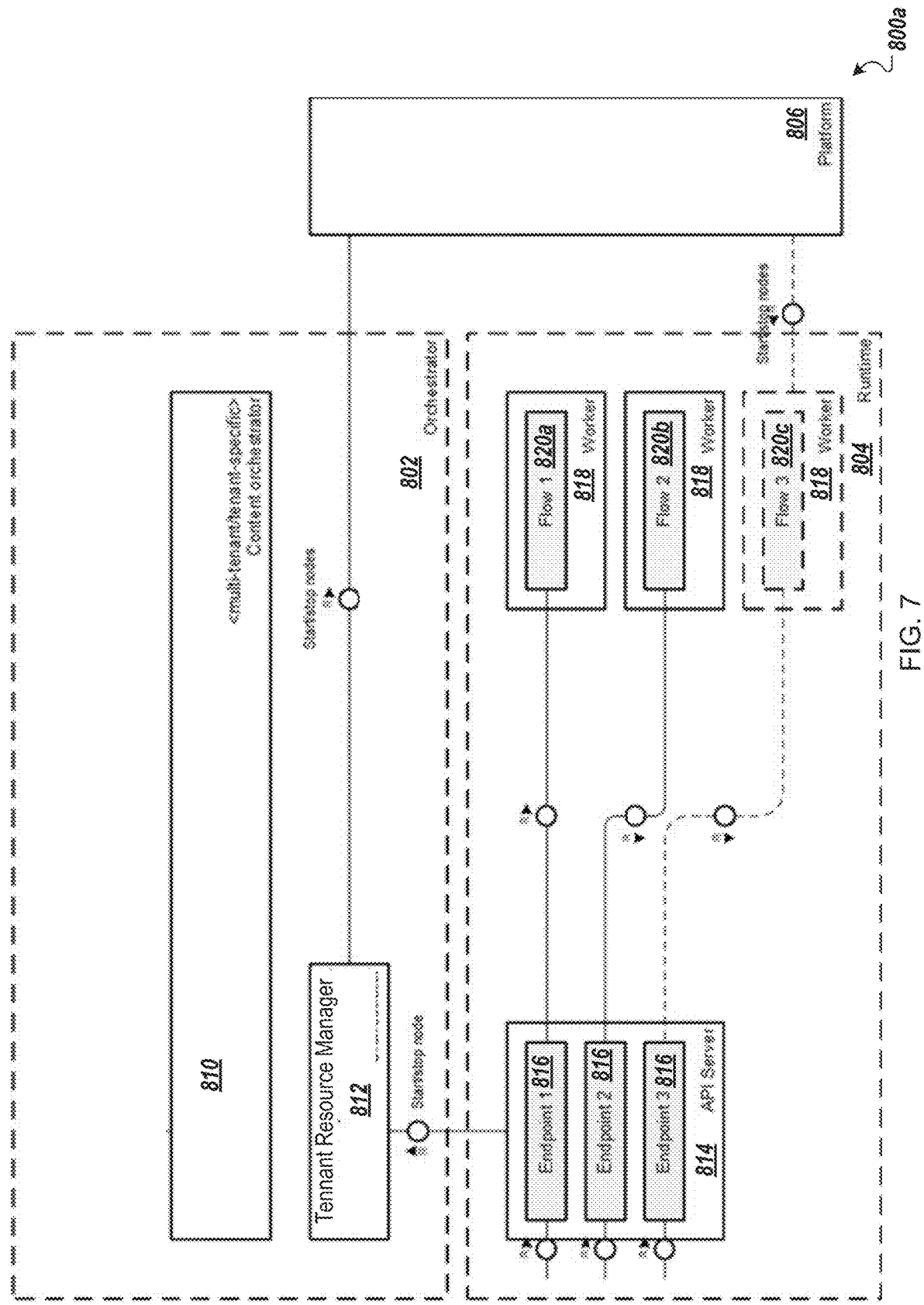
FIG. 7 is a block diagram showing an example of an architecture that includes an orchestrator, a runtime, and a platform.

FIG. 7 is a block diagram showing an example of an architecture 802a that includes an orchestrator 802, a runtime 804, and a platform 806. A tenant resource manager 812 of the orchestrator 802 is responsible for the resource utilization and management of workers, shares, and databases. A content orchestrator 810 of the orchestrator 802 can handle the content for a particular tenant. The result, in the architecture 800a, is that tenant resource manager 812 is multi-tenant and the content orchestrator 810 is tenant-specific.

Figure 8:
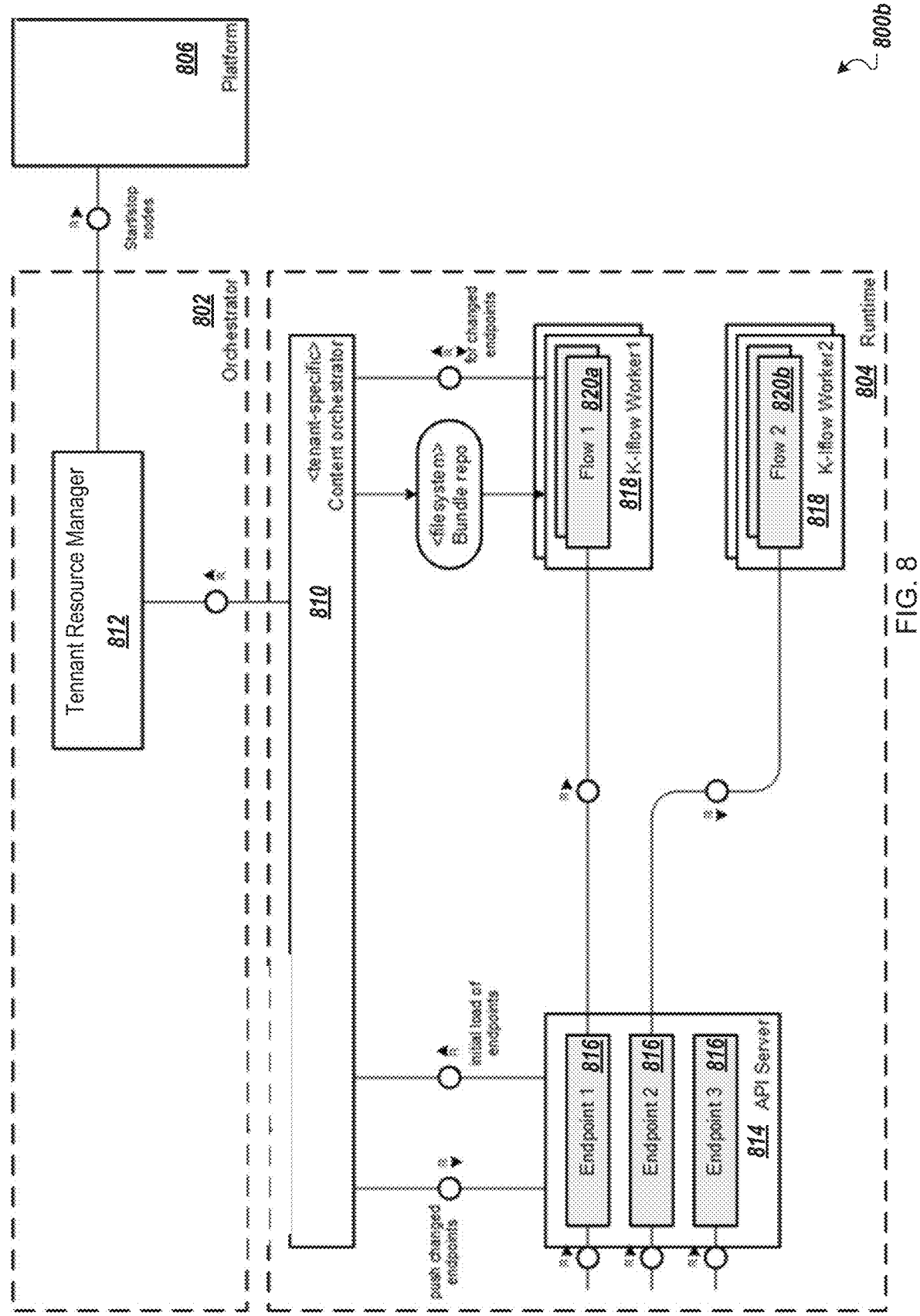
FIG. 8 is a block diagram showing an example of an architecture that includes the orchestrator, the runtime, and the platform.

FIG. 8 is a block diagram showing an example of an architecture 800b that includes the orchestrator 802, the runtime 804, and the platform 806. In the architecture 800b, the content orchestrator 810 is assigned to a microservice of a runtime 804 to handle iFlow bundles for iFlows 820 of worker instances 818.

The goal of a separation between an API server 814 and the worker instances 818 is that workers are only started if there are requests for a particular iFlow. This implies that there has to be a management of worker node instances that includes starting of new workers (if requests for iFlow instances not already used) and stopping workers that are not used within a predetermined time frame. It can be assumed that there is a pool of workers that are available for dispatching. In case a request comes to the API server 814, the worker gets the corresponding iFlow, a message is redirected, and execution can be handled.

The API server 814 handles the lifecycle management operations. An advantage is that the API server 814 handles the workers and iFlows completely. A disadvantage is that there is overlap with functionality of content orchestrator 810. The content orchestrator 810 can be called every time a lifecycle operation is required. An advantage is that the orchestrator 802 has the clear responsibility of handling workers and iFlows. A disadvantage is that the API server 814 has to contact the orchestrator 802 regarding crossing boundaries of microservices and potentially violating the deployment of the runtime 804. The API server 814 can call the content orchestrator 810 to start new workers and to stop unused workers.

FIG. 8C is a block diagram showing an example of an architecture 800c that includes the orchestrator 802, the runtime 804, and the platform 806. In the architecture 800c, iFlows can be deployed directly to worker nodes, and all iFlows can be deployed to all worker nodes of a tenant. In implementations using the single-iFlow container, when an iFlow is deployed to a worker with the dynamic decomposition, it is also required that the iFlow is deployed at a later point in time to the worker.

The API server 814 can trigger the deployment of the iFlow to a worker. In this example, the orchestrator 802 can become a potential bottleneck for deployments, worker node retrieves bundle. Further, worker nodes can get bundles from a repository and deploy bundles without contacting any other node. The worker alone can handle deployment of iFlow, and the worker needs to take over content lifecycle tasks.

Message execution and communication can be delegated to the worker. In some implementations, messages can be synchronous using HTTP. Messages can exist in an object store. Based on the message size, a message can be transferred directly or using the object store, which can provide better resource utilization and thread management. In some implementations, messages can be sent asynchronously using a queue (implying the use of the object store). Messaging can rely completely on the use of the object store. However, based on the message size, the message can be transferred directly. The messaging techniques that are used can depend on considerations of reliability, latency, and the use of a message broker or an object store.

Figure 9:
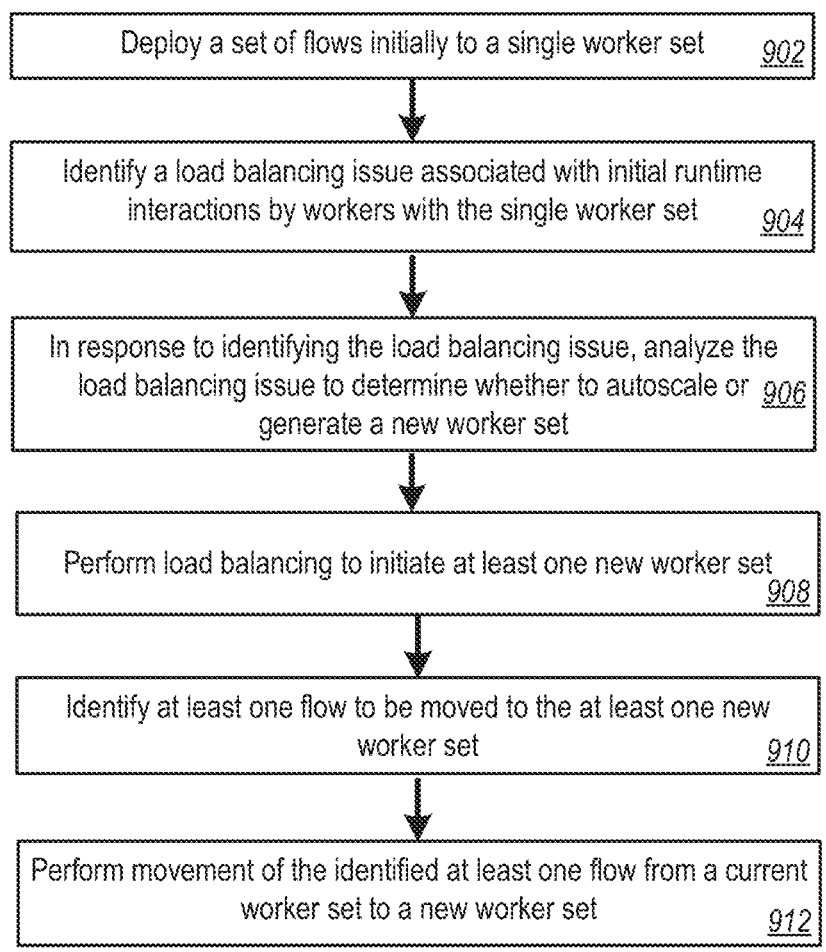
FIG. 9 is a flowchart of an example of a method for reallocating flows to worker sets.

FIG. 9 is a flowchart of an example of a method 900 for reallocating flows to worker sets. Method 900 can be performed by the cloud platform integration system 102, for example. For clarity of presentation, the description that follows generally describes method 900 in the context of FIGS. 1 through 8C.

At 902, a set of flows is initially deployed to a single worker set. As an example, the iFlows 202a-202d can be deployed to the worker set 204.

At 904, a load balancing issue is identified that is associated with initial runtime interactions by workers with the single worker set. For example, the load handler 108 can determine that the worker set 204 has a heavy load (for example, 90%).

At 906, in response to identifying the load balancing issue, the load balancing issue is analyzed to determine whether to autoscale or generate a new worker set. The load handler 108 can determine, for example, whether the worker set 204 should be autoscaled (for example, into worker sets 210 and 212) or new worker sets should be generated by the worker set instantiator 112.

At 908, load balancing is performed to initiate at least one new worker set. For example, the load handler 108 can create new worker sets 210 and 212 that are needed to balance the load.

At 910, at least one flow to be moved to the at least one new worker set is identified. For example, the iFlows 202a-202d can be split by load handler 108 among the new worker sets 210 and 212.

In some implementations, identifying at least one flow to be moved to the at least one new worker set includes randomly moving the at least one flow. For example, random ones of the iFlows 202a-202d can be selected by load handler 108 to be moved to the new worker sets 210 and 212.

In some implementations, identifying at least one flow to be moved to the at least one new worker set can includes performing a pre-calculation to define a complexity metric (for example, determining a complexity of iFlows 202a-202e that are candidates to be re-allocated). For example, complexity can be based on one or more of a number of steps in the flow or a number of special steps in the flow. Special steps can include, for example, mapping steps and scripting steps. The flows can be distributing across worker sets based on the complexity metric. For example, the complexity of the iFlows 202a-202e can determine which of the worker sets 302-306 are to contain specific ones of the iFlows 202a-202e.

At 912, movement of the identified at least one flow from a current worker set to a new worker set is performed. As an example, referring to FIG. 3, the load handler 108 can move iFlow_3 202c to the worker set 306.

Figure 10:
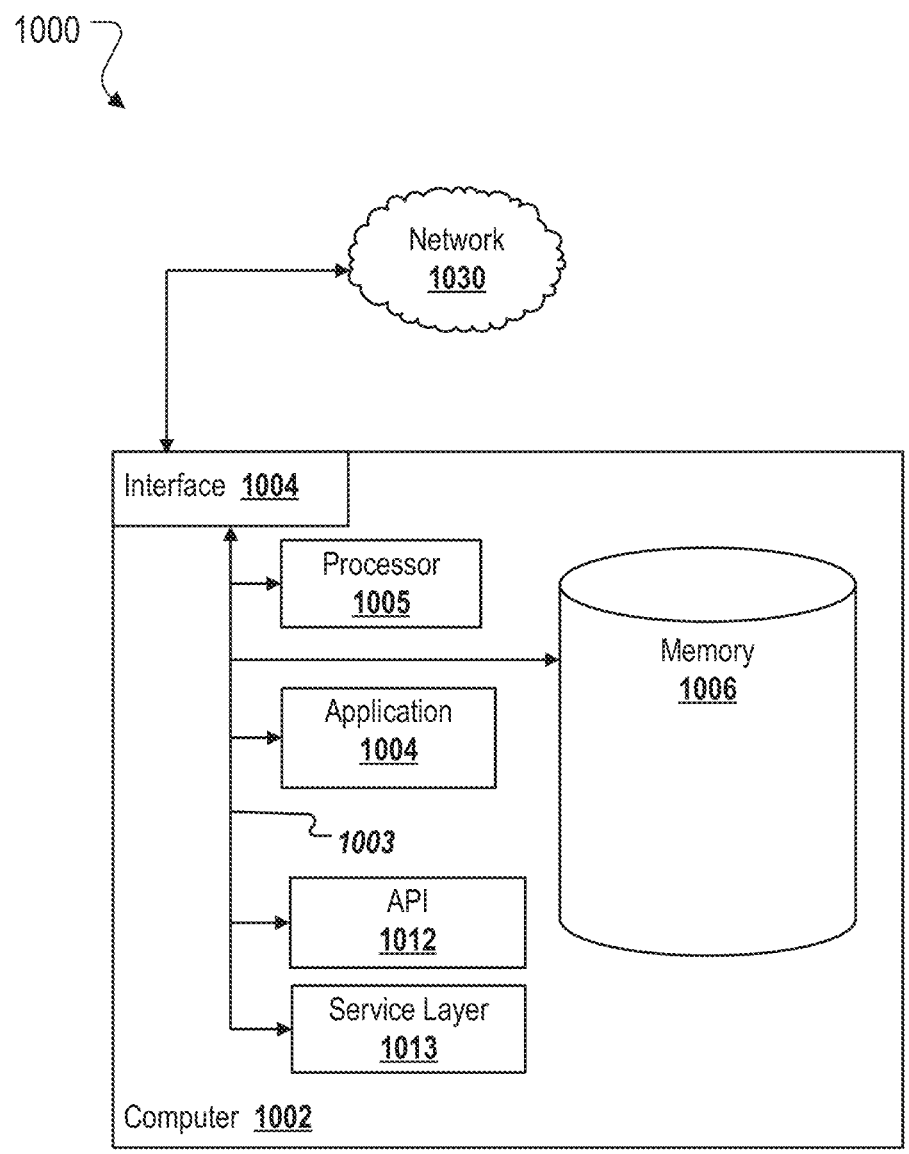
FIG. 10 is a block diagram of an exemplary computer system used to provide computational functionalities associated with described algorithms, methods, functions, processes, flows, and procedures as described in the instant disclosure.

FIG. 10 is a block diagram of an exemplary computer system 1000 used to provide computational functionalities associated with described algorithms, methods, functions, processes, flows, and procedures as described in the instant disclosure.

The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1002 may comprise a computer that includes an input device, such as a keypad, keyboard, touch screen, or other device that can accept user information, and an output device that conveys information associated with the operation of the computer 1002, including digital data, visual, or audio information (or a combination of information), or a graphical user interface (GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or other environment (or a combination of environments).

At a high level, the computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, business intelligence (BI) server, or other server (or a combination of servers).

The computer 1002 can receive requests over network 1030 from a client application (for example, executing on another computer 1002) and responding to the received requests by processing the said requests in an appropriate software application. In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, both hardware or software (or a combination of hardware and software), may interface with each other or the interface 1004 (or a combination of both) over the system bus 1003 using an API 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of the instant disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment that are connected to the network 1030 (whether illustrated or not). Generally, the interface 1004 comprises logic encoded in software or hardware (or a combination of software and hardware) and operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a memory 1006 that holds data for the computer 1002 or other components (or a combination of both) that can be connected to the network 1030 (whether illustrated or not). For example, memory 1006 can be a database storing data consistent with this disclosure. Although illustrated as a single memory 1006 in FIG. 10, two or more memories may be used according to particular needs, desires, or particular implementations of the computer 1002 and the described functionality. While memory 1006 is illustrated as an integral component of the computer 1002, in alternative implementations, memory 1006 can be external to the computer 1002.

The application 1007 is an algorithmic software engine providing functionality according to particular needs, desires, or particular implementations of the computer 1002, particularly with respect to functionality described in this disclosure. For example, application 1007 can serve as one or more components, modules, applications, etc. Further, although illustrated as a single application 1007, the application 1007 may be implemented as multiple applications 1007 on the computer 1002. In addition, although illustrated as integral to the computer 1002, in alternative implementations, the application 1007 can be external to the computer 1002.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:
1. A computer-implemented method comprising:
deploying a set of flows initially to a single worker set;
identifying a load balancing issue associated with initial runtime interactions by workers with the single worker set;

in response to identifying the load balancing issue, analyzing the load balancing issue to determine whether to autoscale or generate a new worker set;

performing load balancing to initiate at least one new worker set;

identifying at least one flow to be moved to the at least one new worker set, wherein identifying the at least one flow to be moved to the at least one new worker set includes:

performing a pre-calculation to define a complexity metric, and distributing, based on the complexity metric, the flows across worker sets; and performing movement of the identified at least one flow from a current worker set to a new worker set.

2. The computer-implemented method of claim 1, wherein the load balancing issues include out-of-memory exceptions.

3. The computer-implemented method of Claim 1, wherein the complexity metric is a measure of complexities of the flow including one or more of a number of steps in the flow or a number of special steps in the flow.

4. The computer-implemented method of claim 3, wherein the special steps include mapping steps and scripting steps.

5. The computer-implemented method of claim 1, wherein the flow represents an integration scenario.

6. A system comprising:

memory storing tables of information for integration scenarios, load balancer rules, and historical information; and a server performing operations comprising:

deploying a set of flows initially to a single worker set;

identifying a load balancing issue associated with initial runtime interactions by workers with the single worker set;

in response to identifying the load balancing issue, analyzing the load balancing issue to determine whether to autoscale or generate a new worker set;

performing load balancing to initiate at least one new worker set;

identifying at least one flow to be moved to the at least one new worker set, wherein identifying the at least one flow to be moved to the at least one new worker set includes:

performing a pre-calculation to define a complexity metric, and distributing, based on the complexity metric, the flows across worker sets; and performing movement of the identified at least one flow from a current worker set to a new worker set.

7. The system of claim 6, wherein load balancing issues include out-of-memory exceptions.

8. The system of claim 6, wherein the complexity metric is a measure of complexities of the flow including one or more of a number of steps in the flow or a number of special steps in the flow.

9. The system of claim 8, wherein the special steps include mapping steps and scripting steps.

10. The system of claim 6, wherein the flow represents an integration scenario.

11. A non-transitory computer-readable media encoded with a computer program, the program comprising instructions that when executed by one or more computers cause the one or more computers to perform operations comprising:

deploying a set of flows initially to a single worker set;

identifying a load balancing issue associated with initial runtime interactions by workers with the single worker set;

in response to identifying the load balancing issue, analyzing the load balancing issue to determine whether to autoscale or generate a new worker set;

performing load balancing to initiate at least one new worker set;

identifying at least one flow to be moved to the at least one new worker set, wherein identifying at least one flow to be moved to the at least one new worker set includes:

performing a pre-calculation to define a complexity metric, and distributing, based on the complexity metric, the flows across worker sets; and performing movement of the identified at least one flow from a current worker set to a new worker set.

12. The non-transitory computer-readable media of claim 11, wherein the load balancing issues include out-of-memory exceptions.

13. The non-transitory computer-readable media of claim 11, wherein the complexity metric is a measure of complexities of the flow including one or more of a number of steps in the flow or a number of special steps in the flow.

14. The non-transitory computer-readable media of claim 13, wherein the special steps include mapping steps and scripting steps.

\* \* \* \* \*